United States Patent
Gros et al.

(10) Patent No.: US 9,996,969 B2
(45) Date of Patent: Jun. 12, 2018

(54) DYNAMICALLY CREATING AND PRESENTING A THREE-DIMENSIONAL (3D) VIEW OF A SCENE BY COMBINING COLOR, BRIGHTNESS, AND INTENSITY FROM MULTIPLE SCAN DATA SOURCES

(71) Applicant: Autodesk, Inc., San Rafael, CA (US)

(72) Inventors: Nicolas Gros, Le Rouret (FR); Luc Franck Robert, Valbonne (FR)

(73) Assignee: Autodesk, Inc., San Rafael, CA (US)

( * ) Notice: Subject to any disclaimer, the term of this patent is extended or adjusted under 35 U.S.C. 154(b) by 0 days. days.

(21) Appl. No.: 15/277,694

(22) Filed: Sep. 27, 2016

(65) Prior Publication Data

US 2018/0089889 A1    Mar. 29, 2018

(51) Int. Cl.
G06T 15/50    (2011.01)
H04N 1/60    (2006.01)
H04N 7/18    (2006.01)
H04N 9/07    (2006.01)

(52) U.S. Cl.
CPC ......... G06T 15/503 (2013.01); H04N 1/6008 (2013.01); H04N 7/183 (2013.01); G06T 2200/04 (2013.01); G06T 2200/08 (2013.01); H04N 9/07 (2013.01)

(58) Field of Classification Search
None
See application file for complete search history.

(56) References Cited

U.S. PATENT DOCUMENTS

| 5,682,229 | A | * | 10/1997 | Wangler | G01S 17/89 348/31 |
| 2010/0110238 | A1 | * | 5/2010 | Kang | H04N 9/646 348/242 |
| 2012/0229650 | A1 | * | 9/2012 | Matthews | G06K 9/6289 348/164 |

OTHER PUBLICATIONS

"About Point Cloud Color Stylization and Visual Effects", Autodesk, Autocad, Dec. 16, 2015 https://knowledge.autodesk.com/support/autocad/learn-explore/caas/CloudHelp/cloudhelp/2016/ENU/AutoCAD-Core/files/GUID-75EBFA48-CB7E-4E91-A1BB-167D96A7119F-htm.html.
"Cyclone pointcloud export format—Description of ASCII .ptx format", Leica Geosystems, last updated Apr. 29, 2015. http://w3.leica-geosystems.com/kb/?guid=5532D590-114C-43CD-A55F-FE79E5937CB2.
"RGB Color Model", Wikipedia, the free encyclopedia, last edited Feb. 28, 2017.
"YUV", Wikipedia, the free encyclopedia, last edited Jun. 5, 2016. https://en.wikipedia.org/wiki/YUV.

* cited by examiner

Primary Examiner — Frank Chen
(74) Attorney, Agent, or Firm — Gates & Cooper LLP

(57) ABSTRACT

A method, system, and computer program product provide the ability to dynamically generate a three-dimensional (3D) scene. A red green blue (RGB) image (in RGB color space) of the 3D scene is acquired. The RGB image is converted from RGB color space to a luminance (Y) and chrominance (UV) image in YUV color space (hat includes Y information and UV information). Reflectance information of the 3D scene is acquired from a laser scanner. Based on a blending function, the luminance information is blended with the reflectance information resulting in a blended YUV image. The blended YUV image is converted from YUV color space into RGB color space resulting in a blended RGB image that is output.

14 Claims, 9 Drawing Sheets
(4 of 9 Drawing Sheet(s) Filed in Color)

DYNAMICALLY CREATING AND PRESENTING A THREE-DIMENSIONAL (3D) VIEW OF A SCENE BY COMBINING COLOR, BRIGHTNESS, AND INTENSITY FROM MULTIPLE SCAN DATA SOURCES

BACKGROUND OF THE INVENTION

1. Field of the Invention

The present invention relates generally to three-dimensional (3D) scan data, and in particular, to a method, apparatus, and article of manufacture for dynamically creating and presenting a 3D view of a scene by combining color, brightness, and intensity from multiple scan data sources. In other words, embodiments of the invention relate to optimizing 3D scan data viewing by dynamically combining color, brightness, and intensity data.

2. Description of the Related Art

The visualization of 3D scan data in applications (e.g., the RECAP™ application or AUTOCAD™ application) can suffer from problems such as under- or over-exposure of RGB (red green blue) data, as well as the lack of texture and color information in scan intensity data (also known as reflectance, i.e., energy of the reflected laser beam). These problems can make the visual interpretation of the point cloud data by the user difficult or even impossible. The problem is usually specific to portions of the scans (e.g., very bright or very dark areas). Accordingly, what is needed is the ability to deliver better visual information to the user in real-time. To better understand these problems a description of prior art applications and visualizations may be useful.

Many computer applications are used to visualize, design, and draft real world objects and scenes. Two exemplary applications are the AUTOCAD™ application and the RECAP™ application (both available from the assignee of the present application). The AUTOCAD™ application is a commercial software application for two-dimensional and 3D computer-aided design (CAD) and drafting. The AUTOCAD™ application is used across a wide range of industries by architects, project managers, engineers, graphic designers, and other professionals to design architectural plans, designs, etc. The RECAP™ application (also known as RECAP 360™) is a reality capture and 3D scanning software application in which users can convert scan file data to a form that can be used in CAD systems, modeling systems, and/or any other type of computer design system.

Commonly, a photograph captures the real world in a 2D representation and with laser scanning, users capture the real world in 3D, like a 3D photograph. A typical representation of laser scanned data is a point cloud. Accordingly, users can capture artifacts, buildings, topographies or even an entire town with laser scanning and then attach the point cloud as a real-world reference in design work. This point cloud data is stored as millions of points. The RECAP™ application processes these massive data sets, and provides the ability to aggregate, enhance, clean, and organize point cloud data from many sources. It also allows measuring, visualizing, and data preparing for efficient use in other programs such as CAD systems (e.g., the AUTOCAD™ application), building information model (BIM) systems, solid modeling applications, etc.

Different color models may be used to represent colors in space (e.g., captured from a camera). One color model is the RGB (red, green, blue) color model. To form a color with RGB, three light beams (one red, one green, and one blue) are superimposed (e.g., by emission from a black screen or by reflection from a white screen). Each of the three beams is called a component of the color and has an arbitrary intensity (from fully on to fully off). A zero intensity for each component (0, 0, 0) provides the darkest color (no light, considered the black) and full intensity (255, 255, 255) of each component gives a white. When the intensities of all the components are the same, the result is a shade of gray, darker or lighter depending on the intensity. When the intensities are different, the result is a colorized hue, more or less saturated depending on the difference of the strongest and the weakest of the intensities of the primary colors used.

The YUV color space defines a color space in terms of one luma (Y) and two chrominance (UV) components. In this regard, the color information (UV) may be added separately to the luma (Y) information. Typically, YUV signals may be created by converting from an RGB source. Weighted values of R, G, and B are summed to produce Y (a measure of overall brightness or luminance). U and V may be computed as scaled differences between Y and the B and R values. The conversion between RGB and YUV space is known to one of ordinary skill in the art and is described in the YUV Wikipedia article found at en.wikipedia.org/wiki/YUV which is incorporated by reference herein.

However, as described above, when image data including RGB information is captured from a classical camera, there may be some missing RGB information (e.g., due to the quality of the camera/lens and/or due to under/over exposure) of certain parts of an image.

As an alternative or in addition to RGB/camera based information, laser scanners may be used to capture 3D information into a point cloud. Point cloud data/information normally consists of RGB data as well as intensity data for each point. As described above, the point cloud information is based on the reflectance—the energy of the reflected laser beam sensed at the scanner. In this regard, each point is associated or is return with a laser pulse return intensity value. Scanners identify an intensity value for each point during the capture process. While the intensity of the reflected laser beam may be strong, the signal received is based on the reflective surface such that color information and/or texture/contrast that is in the visible field (and not the infrared field) may be missing/weak. For example, the reflectance value/information may be dependent on the angle, distance, material of the reflecting surface, orientation of the surface, etc. (e.g., some shading may result in the beam). In other words, the intensity/reflectance value is a measure of point reflectivity that can vary depending upon color, surface texture, surface angle, and the environment. For example, if the orientation of the surface is not orthogonal to the laser beam source, the reflecting beam may be affected. Similarly, in another example, the material of the reflecting surface (e.g., a metal highly reflective surface vs. a fabric or a dull wood surface) can also affect the reflectance value/information.

In view of the above, both the RGB/YUV camera based data and the scanner based point cloud data may be missing information (e.g., color information, texture/contrast information, intensity information, reflectance information, etc.). Such missing information may result in an image that appears under/over exposed in certain areas and/or that is missing definition/clarity. Accordingly, what is needed is the ability to acquire/view an image with as much information/ definition as possible.

SUMMARY OF THE INVENTION

Embodiments of the invention provide a combined use of all the information contained in scans (related scene information including intensity and RGB) to deliver better visual information to the user. For example, reflectance information (e.g., from laser scans) and RGB color information (e.g., from an RGB camera) are combined. Real-time adjustments can be performed in a scene viewer, either directly specified by the user, or indirectly by performing computations that are specific to the portion of the scene the user is looking at within the viewer, and the information contained in that portion of the scene.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Prior art system may provide different settings for viewing a scene: RGB only, or Intensity only, or a heat map based on normal orientation. However, prior art systems do not combine the use of intensity information from one scan (e.g., a laser scanner) with color information from another scan (e.g., an RGB camera image). Further, dynamic adjustment based on the part of the scene that the user is looking at does not exist in prior art scan viewing software.

Embodiments of the invention combines the use of all information contained in multiple scans including intensity and RGB information to provide a better visual representation of the scene to the user.

Hardware Environment

Figure 1:
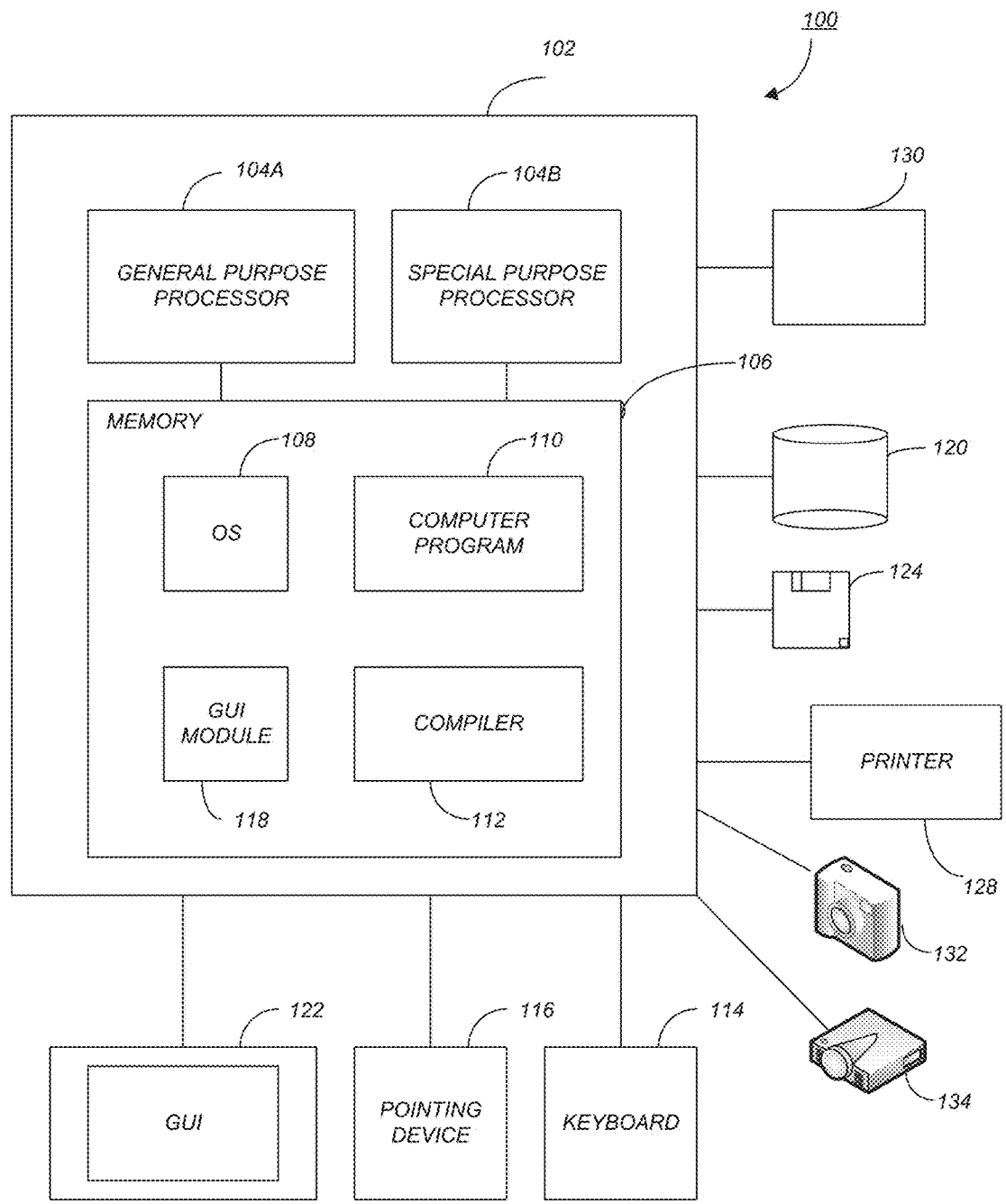
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128.

In one or more embodiments, computer 102 may be coupled to, or may comprise, a camera or photo capturing device 132 (e.g., a digital camera, a cellular phone, a personal digital assistant, etc.). In yet another embodiment, the computer 102 may comprise a multi-touch device, mobile phone, gaming system, internet enabled television, television set top box, or other internet enabled device executing on various platforms and operating systems.

In one or more embodiments, computer 102 is communicatively coupled to, or may comprise, a laser scanner 134. Such a laser scanner 134 may consist of a field measurement device capable of producing a 3D representation of present conditions through the collection of individually measured points. The set of all points collected and registered with another after the scanning process is referred to as a point cloud. Such a point cloud may be stored in data storage devices 120/124, within the scanner 134, in memory 106, and/or in any other device capable of storing such information. The laser scanner 134 may utilize a variety of scanning methods including aerial, static, and mobile. Such laser scanning may scan millions of points in seconds without climbing on equipment and/or conducting contact measurements.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD), portable/handheld game/music/video player/console devices (e.g., IPOD TOUCH, MP3 players, NINTENDO 3DS, PLAYSTATION PORTABLE, etc.), touch tables, and walls (e.g., where an image is projected through acrylic and/or glass, and the image is then backlit with LEDs). Such multi-touch devices may also be integrated with or contain image capture capabilities such as a lens/camera 132, etc.

Some or all of the operations performed by the computer 102 according to the computer program 110 instructions may be implemented in a special purpose processor 104B. In this embodiment, some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as C, C++, Assembly, SQL, PYTHON, PROLOG, MATLAB, RUBY, RAILS, HASKELL, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106, data storage device 120/124, and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
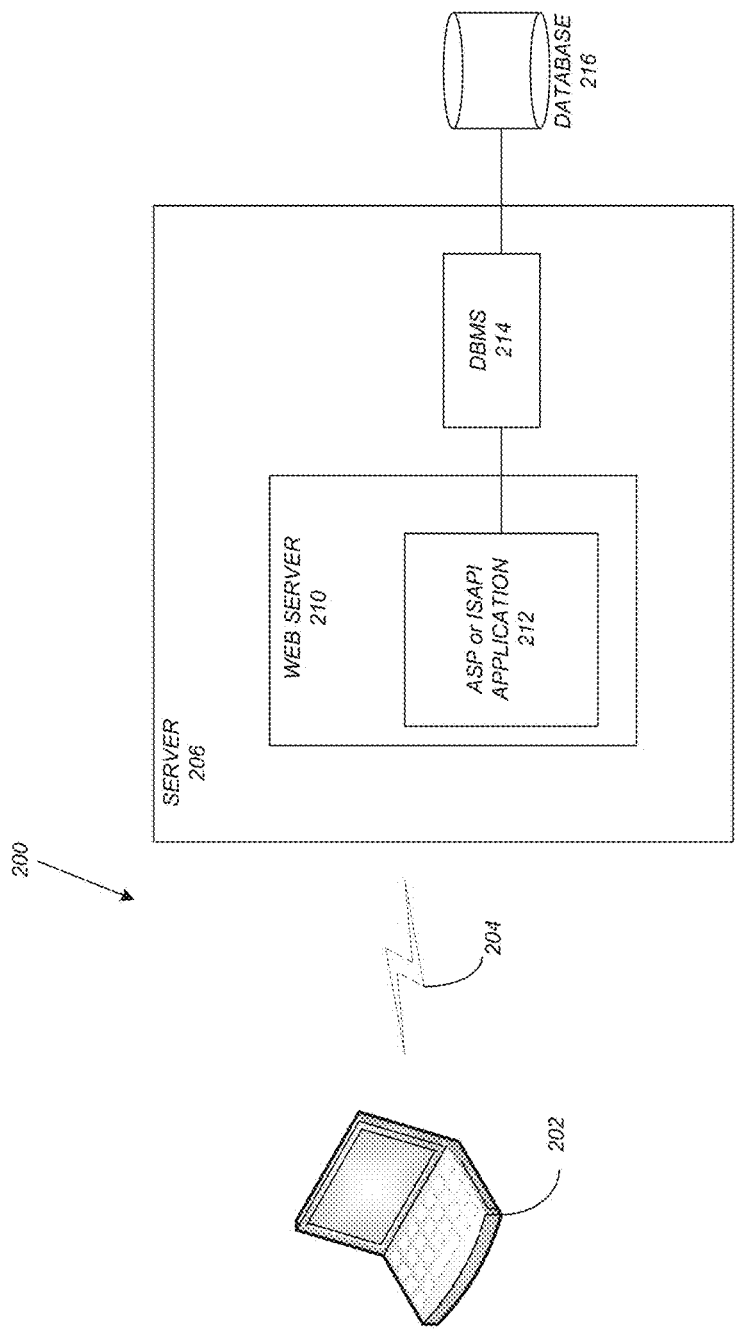
FIG. 2 schematically illustrates a typical distributed/cloud-based computer system using a network to connect client computers to server computers in accordance with one or more embodiments of the invention.

FIG. 2 schematically illustrates a typical distributed/cloud-based computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Further, in a cloud-based computing system, resources (e.g., storage, processors, applications, memory, infrastructure, etc.) in clients 202 and server computers 206 may be shared by clients 202, server computers 206, and users across one or more networks. Resources may be shared by multiple users and can be dynamically reallocated per demand. In this regard, cloud computing may be referred to as a model for enabling access to a shared pool of configurable computing resources.

Clients 202 may execute a client application or web browser and communicate with server computers 206 executing web servers 210. Such a web browser is typically a program such as MICROSOFT INTERNET EXPLORER, MOZILLA FIREFOX, OPERA, APPLE SAFARI, GOOGLE CHROME, etc. Further, the software executing on clients 202 may be downloaded from server computer 206 to client computers 202 and installed as a plug-in or ACTIVEX control of a web browser. Accordingly, clients 202 may utilize ACTIVEX components/component object model (COM) or distributed COM (DCOM) components to provide a user interface on a display of client 202. The web server 210 is typically a program such as MICROSOFT'S INTERNET INFORMATION SERVER.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S TRANSACTION SERVER (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206. Embodiments of the invention may be implemented as a software application on a client 202 or server computer 206. Further, as described above, the client 202 or server computer 206 may comprise a thin client device or a portable device that has a multi-touch-based display.

Software Embodiment Details

As described above, RGB information (e.g., from an RGB camera) may be missing information (e.g., due to under/over exposure). Similarly, reflectance information (e.g., from a laser scanner) may also be missing information (e.g., color/texture/contrast information). However, the reflectance information (e.g., in the reflectance information) may carry visual information in areas where a standard RGB camera does not provide information. Similarly, the RGB information may carry information that is missing from the reflectance information. Accordingly, embodiments of the invention combine both the reflectance information and the RGB color information to create an optimized view of a scene.

Figure 3:
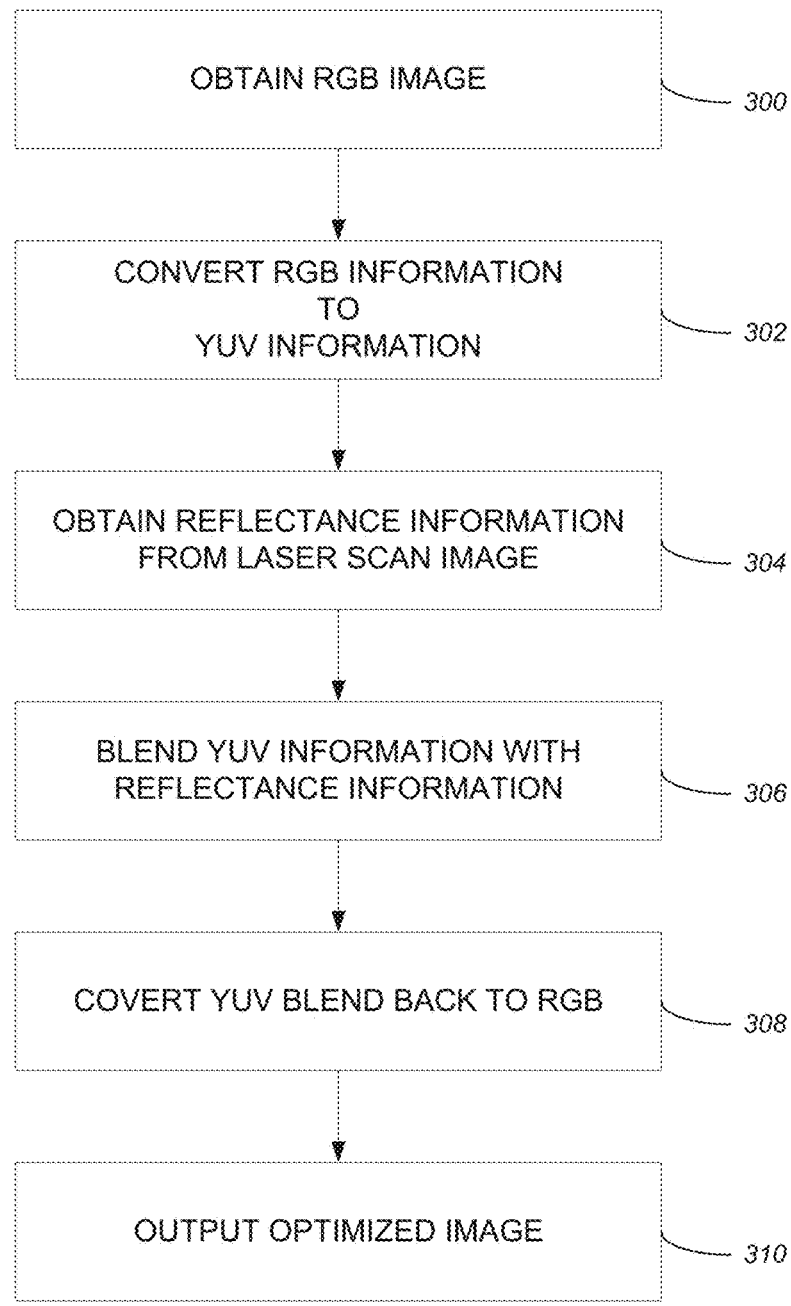
FIG. 3 illustrates the logical flow for dynamically combining color, brightness, and intensity from multiple image sources in accordance with one or more embodiments of the invention.
Figure 4:
FIG. 4 illustrates an exemplary RGB image that is acquired in step 300 of FIG. 3 in accordance with one or more embodiments of the invention.

FIG. 3 illustrates the logical flow for dynamically combining color, brightness, and intensity from multiple image sources in accordance with one or more embodiments of the invention. At step 300, an RGB image (of a 3D scene) is obtained/acquired (the RGB image is in RGB color space) (e.g., from a camera). FIG. 4 illustrates an exemplary RGB image 400 that is acquired in step 300. As illustrated, some texture is available in area 402. However, areas 404 are overexposed and no/few details are visible.

At step 302, the RGB information in image 400 is converted into YUV image data. In this regard, the RGB color information may be converted into the UV channels in a YUV representation (Y luminance information and UV chrominance information). Any type of RGB to YUV conversion operation may be utilized and such conversions are known to one of ordinary skill in the art. For example, the conversion process described in WIKIPEDIA may be used (en.wikipedia.org/wiki/YUV) and is incorporated by reference herein.

Figure 5:
FIG. 5 illustrates the luminance information (i.e., Y information) from an RGB to YUV conversion of the RGB image in accordance with one or more embodiments of the invention.
Figure 6:
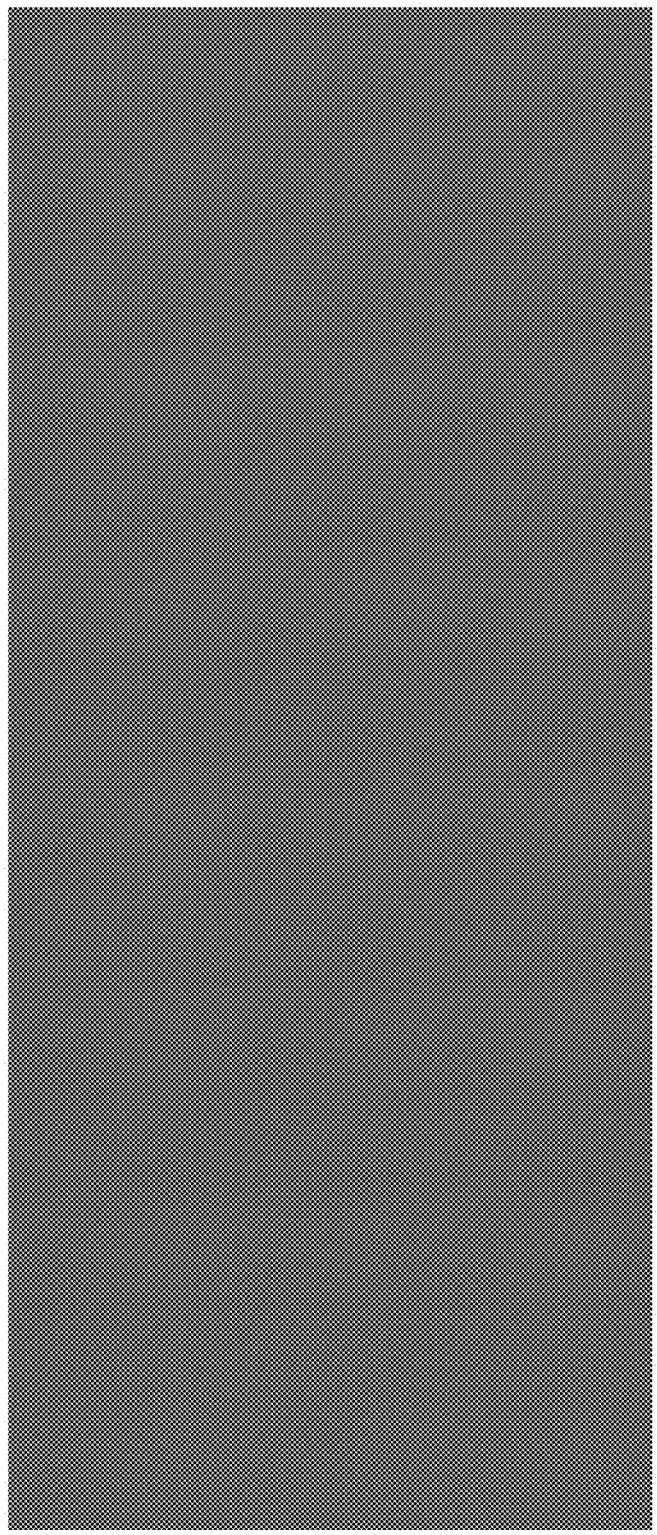
FIG. 6 illustrates the color information (i.e., UV data) from the RGB to YUV conversion of the RGB image in accordance with one or more embodiments of the invention.

FIG. 5 illustrates the luminance information (i.e., Y information) from an RGB to YUV conversion of the RGB image 400 in accordance with one or more embodiments of the invention. Similarly, FIG. 6 illustrates the color information (i.e., UV data) from the RGB to YUV conversion of the RGB image 400 in accordance with one or more embodiments of the invention.

In embodiments of the invention, such a conversion to YUV space enables a determination of which elements of the RGB image 400 are under/over exposed (e.g., area 404). In other words, the YUV space enables a determination of where the luminance information (Y values) is lacking. For example, if the luminance information for a pixel is very light or very dark (e.g., at one of the ends of the luminance range), then one may conclude that the pixel is under/over exposed. In an example, the luminance range may be from 16 to 235 (with the UV range of 16 to 240). A similar conclusion may be made with respect to RGB information (e.g., if a particular channel [e.g., R, G, or B channel] value is close to the minimum value of 0 or the maximum value of 255, one may conclude that the pixel with that value is under/over exposed.

Figure 7:
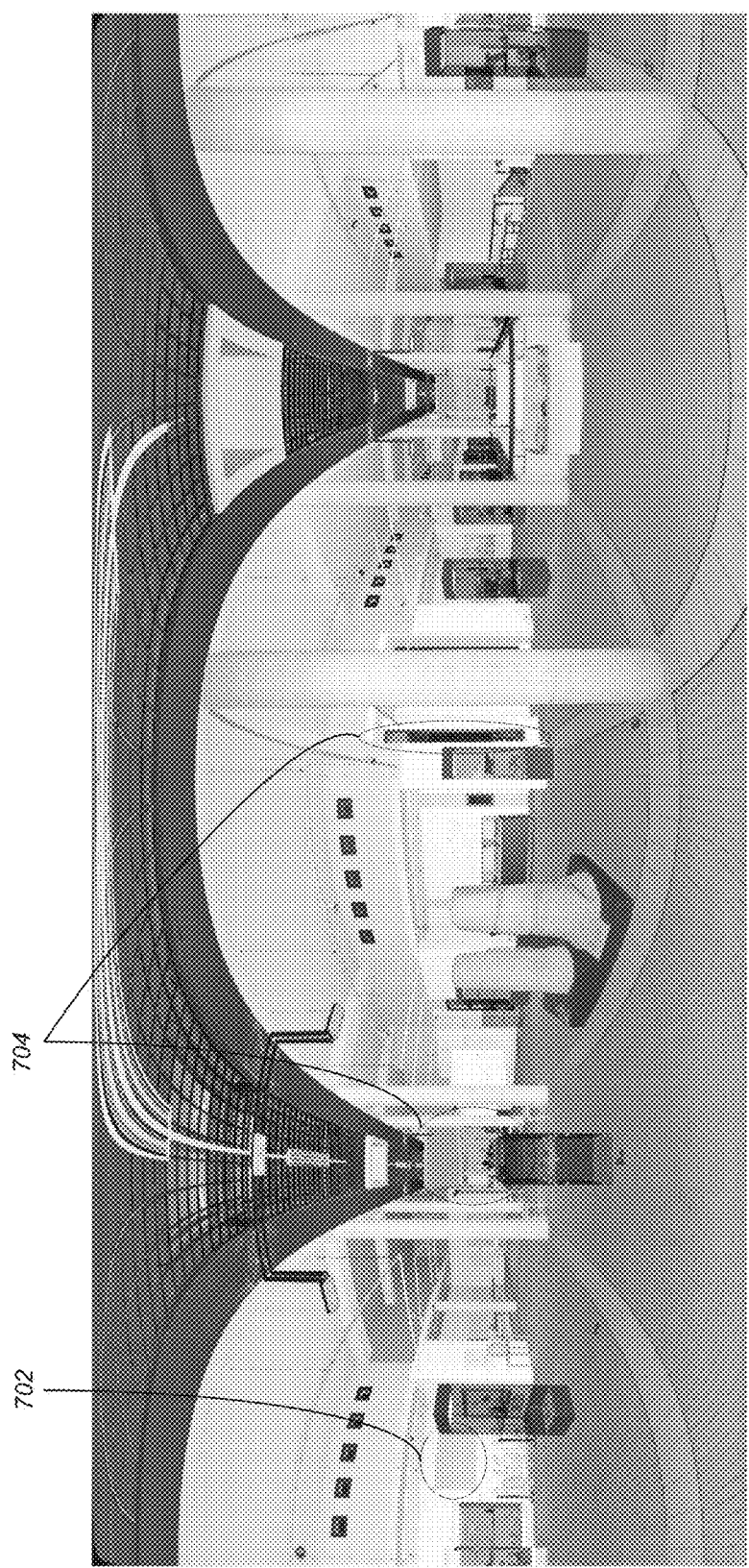
FIG. 7 illustrates the original intensity information from a laser beam scan (i.e., reflectance information) in accordance with one or more embodiments of the invention.

Returning to FIG. 3, at step 304, the reflectance information is obtained/acquired from a laser scanned image/laser scanner. FIG. 7 illustrates the original intensity information from a laser beam scan (i.e., reflectance information) in accordance with one or more embodiments of the invention. As illustrated, area 702 does not have any texture information (e.g., compared to that of area 402 of FIG. 4). Further, unlike areas 404 of FIG. 4, areas 704 of FIG. 7 provide some details.

Step 304 may also include a registration process that maps/registers the RGB/YUV information/pixels to the point cloud. While any type of registration process may be utilized, an exemplary registration process is described in U.S. Provisional Patent Application Ser. No. 62/263,476 entitled "KPPF: Keypoint-Based Point-Pair-Feature for Scalable Automatic Global Registration of Large RGB-D Scans" by Luc Franck Robert, Nicolas Gros, Yann Noutary, Lucas Malleus, Frederic Precioso, and Diane Lingrand, filed on Dec. 4, 2015, which is incorporated by reference herein.

Figure 8:
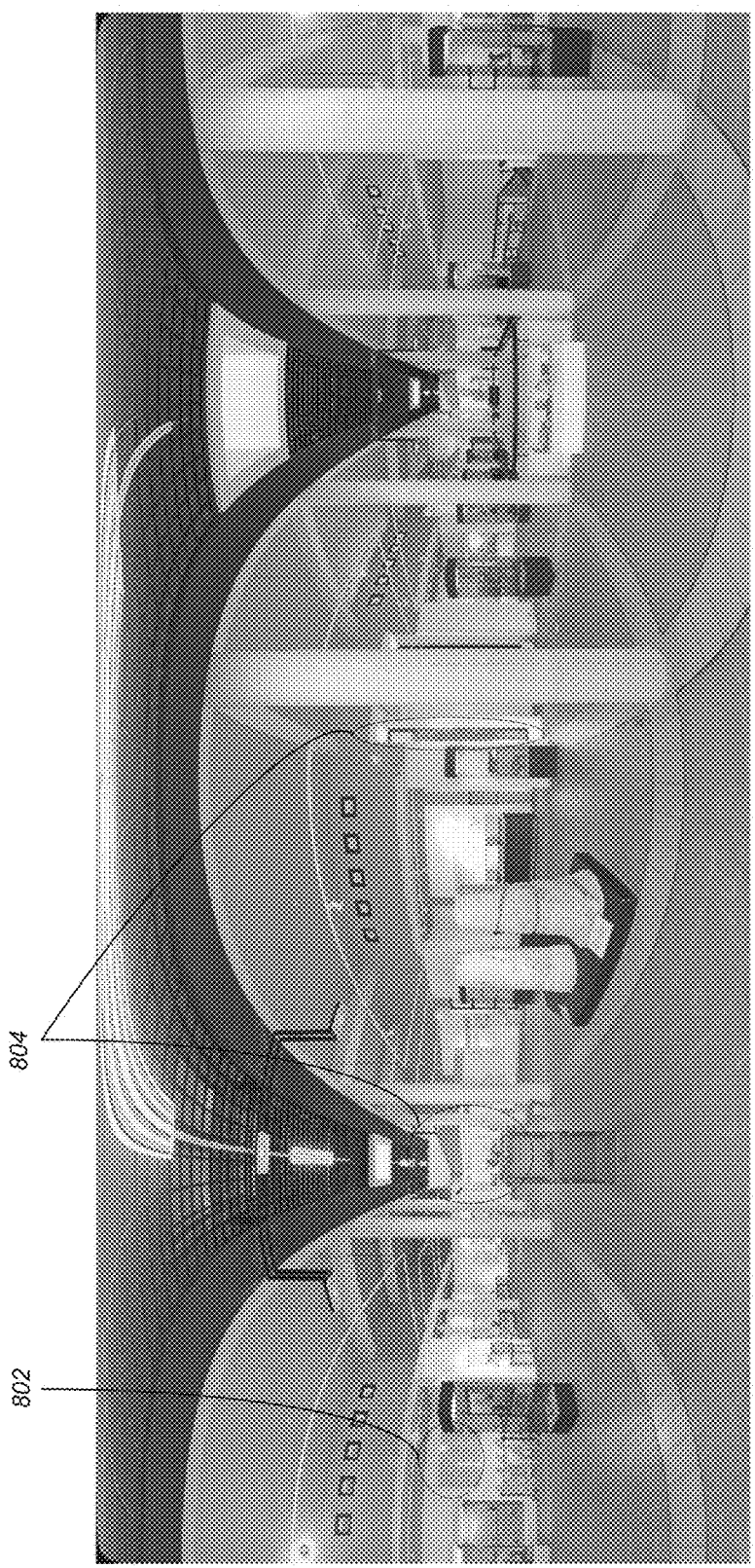
FIG. 8 illustrates the blending luminance information (Y) and intensity information (I) in accordance with one or more embodiments of the invention.

At step 306, the YUV information is blended with the reflectance information (e.g., on a pixel by pixel basis) based on a blending function (resulting in a blended YUV image). For example, for each pixel, the RGB information is converted to YUV at step 302, and different weights may be used to blend the YUV information with the reflectance information. In one instance, if the luminance Y value is close to 0, only the reflectance information may be used. Similarly, if the luminance Y is close to the maximum (e.g., 235), then the luminance information may be used. Luminance values in between may consist of a blending based on a linear weighting system (or other non-linear type of blending). FIG. 8 illustrates the blending luminance information (Y) and intensity information (I) in accordance with one or more embodiments of the invention. As illustrated, the blend contains the texture information in area 802 (e.g., from the RGB image area 402) as well as the details in areas 804 (e.g., from the reflectance based information areas 704). As described herein, the blending function may consist of completely replacing the luminance information with the reflectance information, blending based on parabolic weighting, blending using a weighting where the weighting varies based on a value of the luminance information (e.g., wherein reflectance information may be weighted heavier than luminance information when the value of the luminance information indicates an over-exposure [e.g., a luminance value within a threshold of a maximum luminance value]), etc. Further, the blending may be performed in real time dynamically when the 3D scene is displayed, and/or dynamically on the fly based on a portion of the 3D scene displayed in a viewing area.

Figure 9:
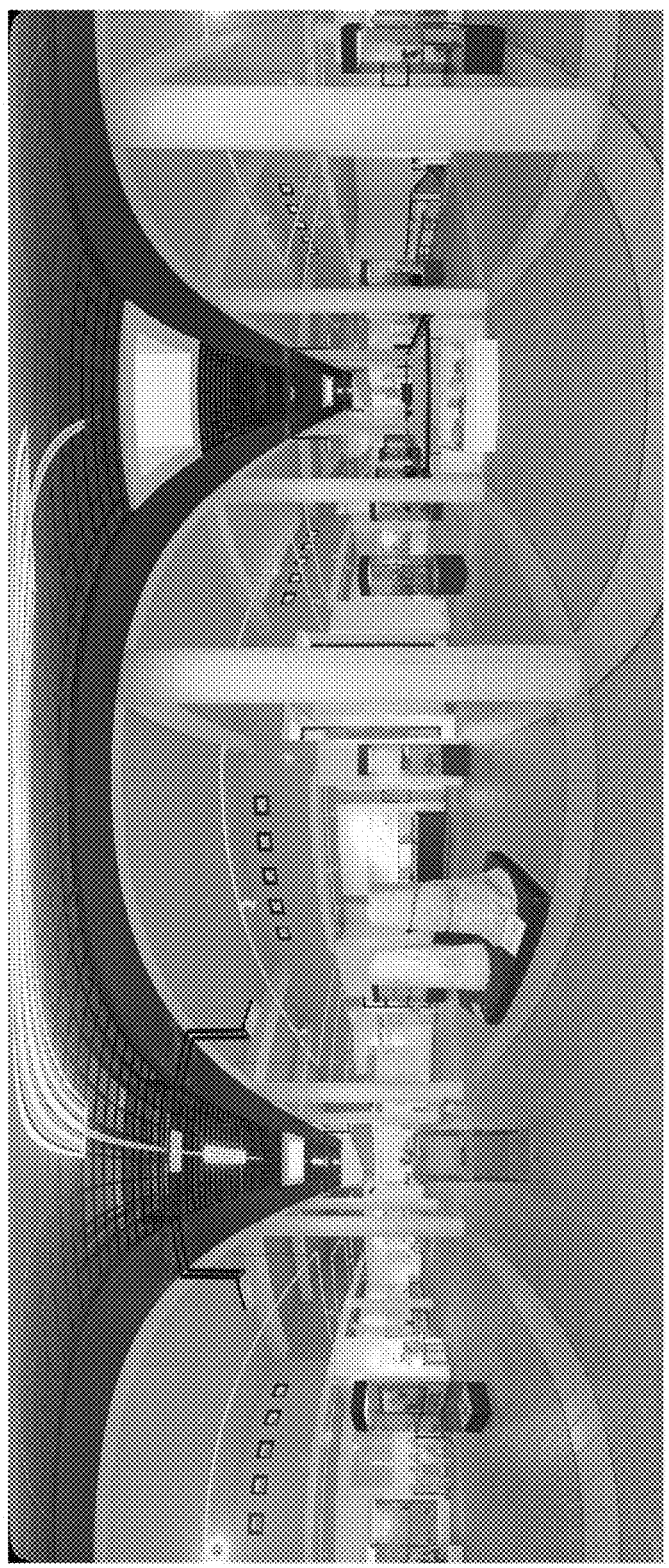
FIG. 9 illustrates the final result mixing the color information with the blended information of FIG. 8 in accordance with one or more embodiments of the invention.

Once blended, the blended YUV image is converted back to RGB color space at step 308 and output and step 310. FIG. 9 illustrates the final result mixing the color information with the blended information of FIG. 8 in accordance with one or more embodiments of the invention.

The following code illustrates an exemplary processing of a single pixel in accordance with one or more embodiments of the invention. Two different examples of simple blending functions are illustrated (constantWeight and parabolic-Weight):

```
inline double constantWeight(unsigned char /*i*/ )
{
  return 0.5;
}
double parabolicWeight(unsigned char 1)
{
  const double minW = 0.1;
  const double maxW = 0.9;
  const double a = 4 * (minW-maxW) / 255 / 255;
  const double b = 4 * (maxW-minW) / 255;
  const double c = minW;
  return a*i*1 + b*i + c;
}
inline void writeBlendToColorPixel(RCRGB& pixel, const
RCVector4ub& color, unsigned short initensity)
{
  const auto shortToCharRangeBitShift = 8 * (sizeof(unsigned
      short) - sizeof(unsigned char)); // 16 - -> 8 bits
  const auto intensityAs8bitColor = static_cast<unsigned
      char>(intensity >> shortToCharRangeBitShift);
  if (intensityAs8bitColor > 0)
  {
    RCMatrix4x4d rgb2yuv(0.299, 0.587, 0.114, 0,
        -0.14713, 0.28886, 0.436, 0,
        0.615, -0.51499, 0.10001, 0,
        0, 0, 0, 1);
    RCMatrix4x4d yuv2rgb(1, 0, 1.13983, 0,
        1, -0.39465, -0.5806, 0,
        1, 2.03211, 0, 0,
        0, 0, 0, 1);
    RCVector4d yuv =
rgb2yuv.multiplyRowMajor(RCVector4d(color.x, color.y, color.z,
1));
    yuv /= yuv.w;
    //const double weight =
constantWeight(static_cast<unsigned char>(yuv.x));
    const double weight = parabolicWeight(static_cast<unsigned
char>(yuv.x));
    yuv.x = weight * yuv.x + (1.0 - weight) *
intensityAs8bitColor;
    RCVector4d rgb = yuv2rgb.multiplyRowMajor(yuv);
    rgb /= rgb.w;
    pixel.r = static_cast<unsigned char>(std::min(255.,
std::max(0., rgb.x)));
    pixel.g = static_cast<unsigned char>(std::min(255.,
std::max(0., rgb.y)));
    pixel.b = static_cast<unsigned char>(std::min(255.,
std::max(0., rgb.z)));
  }
  else
    pixel.r = pixel.g = pixel.b = 0;
}
```

In the first part of the above code snippet, the two exemplary blending functions are set forth—if the blending function is a constant weight, a value of 0.5 is returned. If the blending function is a parabolic weight, the various values for a parabolic equation are returned.

The writeBlendToColorPixel function has three (3) input values: a pixel (with RGB values), a vector (i.e., the reflectance information), and intensity information (e.g., from the RGB image). The function outputs the blended values into the RGB channels. The function first changes the intensity value from 16 bits to 8 bits. If the 8-bit intensity value is greater than 0, a blending is performed. If the 8-bit intensity value is 0, then the pixels retain their original RGB value (i.e., the intensity value will not add/contribute any information to the original RGB information, and therefore, no change is needed).

For the blending, to enable step 302, two matrices to be used in converting RGB values to YUV space and vice versa are declared. The RGB data is then converted to YUV space (see "RCVector4D yuv=. . . ."). Thereafter, the blending is performed by multiplying the weight (e.g., using the parabolic weighting function or the constant weighting function [the code snippet currently has the constant weight function disabled as a comment and the parabolic weight function active]) by the YUV value, and adding the result to the multiplication of (1.0-weight) and the 8-bit intensity value. The YUV value is converted back to the RGB value (e.g., step 308) and then output (e.g., step 310).

Thus, in the example provided, the blending is based on the intensity value coming from the RGB image. In addition to that described above, multiple different scans can be combined based on a blending function. For example, if three different scans have been taken, the same area in space may be normal in one scan and under/over exposed in the other scans. In such a case, a local transformation of the intensity/RGB values may be performed to pick the best scan for preferential information, and the other scans may be assigned a smaller weight. Alternatively, some type of blending function may be used to combine all of the scans.

Further to the above, embodiments of the invention may perform the blending/combining/optimization (e.g., of the RGB information and reflectance information) dynamically based on user input. For example, a user may indicate that a particular part of the scanner/scanner information needs additional texture information, intensity information, etc. Thus, the user may manually specify a part of the image that needs additional texture/intensity information (e.g., by selecting/identifying an area via a geometric shape and a cursor). Accordingly, specifying such an area may be manually performed by the user actually identifying an area. Alternatively, the part of the image that needs additional texture/intensity/reflectance information may be inherent based on the area the viewer is actually viewing in a viewer window/area.

In addition to the above, one aspect of embodiments of the invention consists of keeping the color information (UV channels in a YUV representation) and changing the intensity information coming from the RGB data, and combining it with the scan intensity/reflectance information. The combination can be a complete replacement, or a blending using any function. This combination can be done in real time at display time, or statically when reading the data. Dynamic adjustment can be done on the fly depending on the local RGB information shown in the scene viewer. If the user is looking at an area that is over-exposed (all intensities are very close to the maximal value)(e.g., areas 404), then more importance may be given to the scan intensity information in the blending function.

The same principle can be applied to compensate for differences of exposure in the RGB data collected in different scans that have been registered together. Without compensation, points from one scan can appear very dark, and points from another scan very bright, while these points are neighbors in space and appear next to each other in the viewer. Compensation functions can be computed (e.g., through histogram equalization) so that when applied to the RGB data of one scan, it looks much more similar to the other scan. Such a compensation function can be cascaded/composed in the viewer with the other functions described above.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for dynamically generating a three-dimensional (3D) scene, comprising:
   acquiring a red green blue (RGB) image of the 3D scene, wherein the RGB image is in RGB color space;
   converting the RGB image from RGB color space to a luminance (Y) and chrominance (UV) image in YUV color space comprising luminance (Y) information and UV information;
   acquiring reflectance information of the 3D scene from a laser scanner;
   based on a blending function, blending the luminance information with the reflectance information resulting in a blended YUV image, wherein the blending function provides for completely replacing the luminance information with the reflectance information;
   converting the blended YUV image from YUV color space into RGB color space resulting in a blended RGB image; and
   outputting the blended RGB image.

2. The computer-implemented method of claim 1, wherein the RGB image is acquired from a camera.

3. The computer-implemented method of claim 1, wherein the blending is performed on a pixel by pixel basis.

4. The computer-implemented method of claim 1, wherein the blending is performed in real time dynamically when the 3D scene is displayed.

5. The computer-implemented method of claim 1, wherein the blending is performed dynamically on the fly based on a portion of the 3D scene displayed in a viewing area.

6. A computer-implemented method for dynamically generating a three-dimensional (3D) scene, comprising:
   acquiring a red green blue (RGB) image of the 3D scene, wherein the RGB image is in RGB color space:
   converting the RGB image from RGB color space to a luminance (Y) and chrominance (UV) image in YUV color space comprising luminance (Y) information and UV information;
   acquiring reflectance information of the 3D scene from a laser scanner;
   based on a blending function, blending the luminance information with the reflectance information resulting in a blended YUV image, wherein the blending function provides blending the luminance information with the reflectance information based on a parabolic weighting;
   converting the blended YUV image from YUV color space into RGB color space resulting in a blended RGB image; and
   outputting the blended RGB image.

7. A computer-implemented method for dynamically generating a three-dimensional (3D) scene, comprising:
   acquiring a red green blue (RGB) image of the 3D scene, wherein the RGB image is in RGB color space;
   converting the RGB image from RGB color space to a luminance (Y) and chrominance (UV) image in YUV color space comprising luminance (Y) information and UV information;
   acquiring reflectance information of the 3D scene from a laser scanner;
   based on a blending function, blending the luminance information with the reflectance information resulting in a blended YUV image, wherein:
      the blending function provides blending the luminance information with the reflectance information using a weighting wherein the weighting varies based on a value of the luminance information;
      the reflectance information is weighted heavier than the luminance information when the value of the luminance information indicates an over exposure; and
      the over exposure is indicated by the value of the luminance information being within a threshold of a maximum luminance value;
   converting the blended YUV image from YUV color space into RGB color space resulting in a blended RGB image; and
   outputting the blended RGB image.

8. A system for dynamically generating a three-dimensional (3D) scene in a computer, comprising:
   (a) a computer having a memory;
   (b) a laser scanner communicatively coupled to the computer, wherein the laser scanner acquires reflectance information of the 3D scene;
   (c) an application executing on the computer, wherein the application:
      (i) acquires a red green blue (RGB) image of the 3D scene, wherein the RGB image is in RGB color space;
      (ii) convert the RGB image from RGB color space to a luminance (Y) and chrominance (UV) image in YUV color space comprising luminance (Y) information and UV information;
      (iii) based on a blending function, blends the luminance information with the reflectance information resulting in a blended YUV image, wherein the blending function provides completely replacing the luminance information with the reflectance information;
      (iv) converts the blended YUV image from YUV color space into RGB color space resulting in a blended RGB image; and
      (v) outputs the blended RGB image.

9. The system of claim 8, wherein the RGB image is acquired from a camera.

10. The system of claim 8, wherein the application blends on a pixel by pixel basis.

11. The system of claim 8, wherein the application blends in real time dynamically when the 3D scene is displayed.

12. The system of claim 8, wherein the application blends dynamically on the fly based on a portion of the 3D scene displayed in a viewing area.

13. A system for dynamically generating a three-dimensional (3D) scene in a computer, comprising:
    (a) a computer having a memory;
    (b) a laser scanner communicatively coupled to the computer, wherein the laser scanner acquires reflectance information pf the 3D scene;
    (c) an application executing on the computer, wherein the application:
        (i) acquires a red green blue (RGB) image of the 3D scene, wherein the RGB image is in RGB color space;
        (ii) convert the RGB image from RGB color space to a luminance (Y) and chrominance (UV) image in YUV color space comprising luminance (Y) information and UV information;
        (iii) based on a blending function, blends the luminance information with the reflectance information resulting in a blended YUV image, wherein the blending function provides blending the luminance information with the reflectance information based on a parabolic weighting;
        (iv) converts the blended YUV image from YUV color space into RGB color space resulting in a blended RGB image; and
        (v) outputs the blended RGB image.

14. A system for dynamically generating a three-dimensional (3D) scene in a computer, comprising:
    (a) a computer having a memory;
    (b) a laser scanner communicatively coupled to the computer, wherein the laser scanner acquires reflectance information of the 3D scene;
    (c) an application executing on the computer, wherein the application:
        (i) acquires a red green blue (RGB) image of the 3D scene, wherein the RGB image is in RGB color space;
        (ii) convert the RGB image from RGB color space to a luminance (Y) and chrominance (UV) image in YUV color space comprising luminance (Y) information and UV information;
        (iii) based on a blending function, blends the luminance information with the reflectance information resulting in a blended YUV image, wherein:
            (1) the blending function provides blending the luminance information with the reflectance information using a weighting wherein the weighting varies based on a value of the luminance information
            (2) the reflectance information is weighted heavier than the luminance information when the value of the luminance information indicates an over exposure; and
            (3) the over exposure is indicated by the value of the luminance information being within a threshold of a maximum luminance value;
        (iv) converts the blended YUV image from YUV color space into RGB color space resulting in a blended RGB image; and
        (v) outputs the blended RGB image.

* * * * *